(12) United States Patent
Yokoyama et al.

(10) Patent No.: US 7,213,861 B2
(45) Date of Patent: May 8, 2007

(54) RETRACTABLE SEAT DEVICE

(75) Inventors: Takashi Yokoyama, Kariya (JP);
Naoaki Hoshihara, Obu (JP)

(73) Assignee: Aisin Seiki Kabushiki Kaisha,
Kariya-shi, Aichi-ken (JP)

( * ) Notice: Subject to any disclaimer, the term of this patent is extended or adjusted under 35 U.S.C. 154(b) by 131 days.

(21) Appl. No.: 11/166,204

(22) Filed: Jun. 27, 2005

(65) Prior Publication Data
US 2005/0285424 A1 Dec. 29, 2005

(30) Foreign Application Priority Data
Jun. 28, 2004 (JP) .............................. 2004-190071

(51) Int. Cl.
*B60N 2/02* (2006.01)
(52) U.S. Cl. ..................... 296/65.09; 297/15; 297/331; 296/37.14
(58) Field of Classification Search ............. 296/65.05, 296/65.09, 66, 69, 37.14, 37.16; 297/15, 297/378.12, 378.1, 331, 335, 334
See application file for complete search history.

(56) References Cited
U.S. PATENT DOCUMENTS
5,195,795 A * 3/1993 Cannera et al. .......... 296/65.09

6,869,138 B2 * 3/2005 Rhodes et al. ................. 297/15
2001/0052718 A1 * 12/2001 Sugiura et al. ............... 297/15
2005/0134076 A1 * 6/2005 Storto et al. .................. 296/66
2006/0138795 A1 * 6/2006 Weber ..................... 296/65.05

FOREIGN PATENT DOCUMENTS
JP 2001-347865 12/2001

* cited by examiner

*Primary Examiner*—Lori L. Coletta
(74) *Attorney, Agent, or Firm*—Finnegan, Henderson, Farabow, Garrett & Dunner, LLP

(57) ABSTRACT

A retractable seat device includes a seat body having first and second ends rotatably connected to rear and front legs, respectively, first and second arms, and a link. When the first arm is rotated in a second direction, the rear leg and the front leg connected to the rear leg with the link are unfolded, a rear lock mechanism provided on the rear leg becomes engaged with a first striker provided on the vehicle floor, and then a front lock mechanism provided on the front leg becomes engaged with a second striker provided on the vehicle floor, so that the seat body is supported on the vehicle floor by the rear leg and the front leg. The rear lock mechanism has an interlock structure including a ratchet and a pawl, and the front lock mechanism has a hook lock structure including a hook.

8 Claims, 4 Drawing Sheets

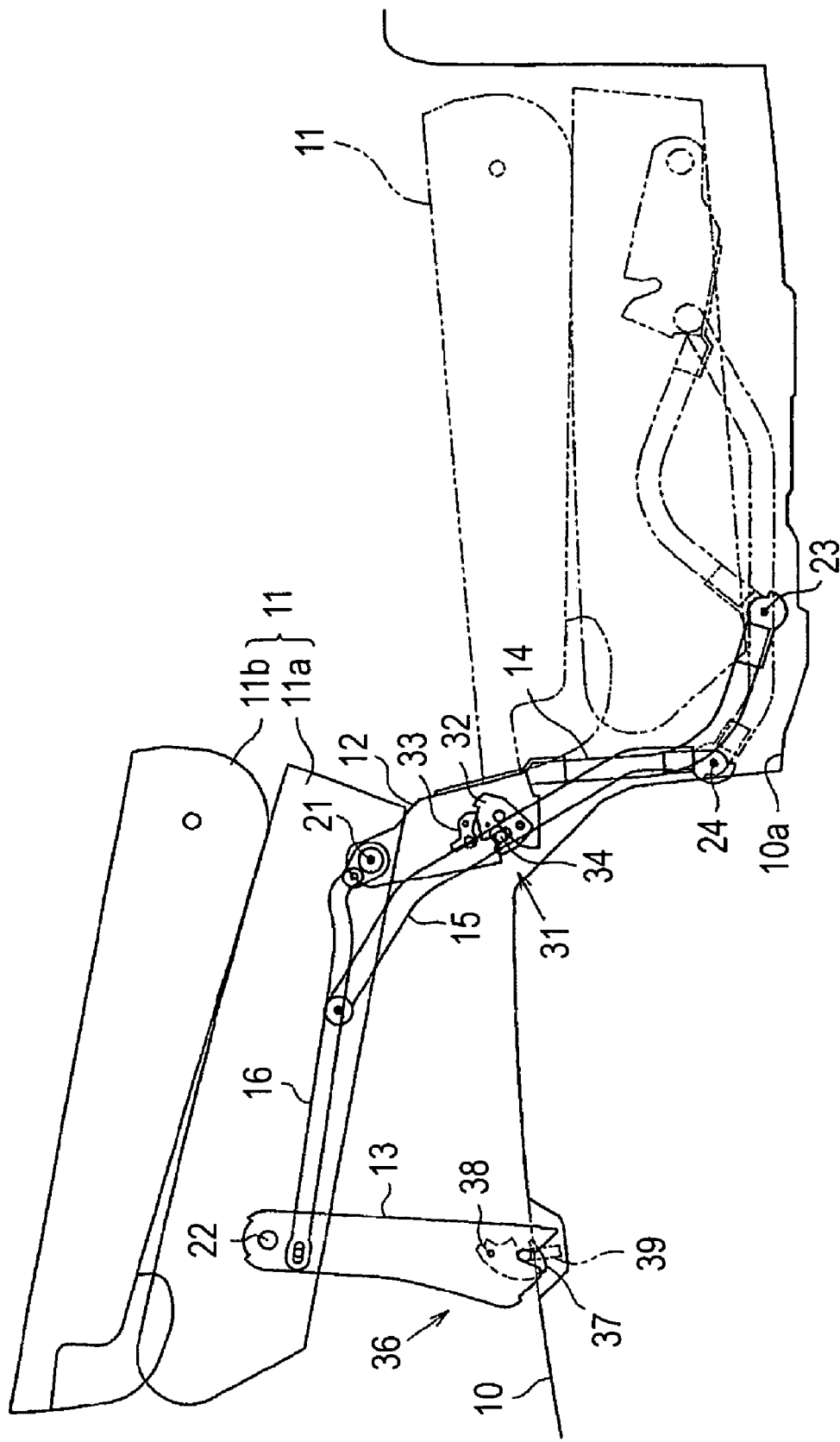

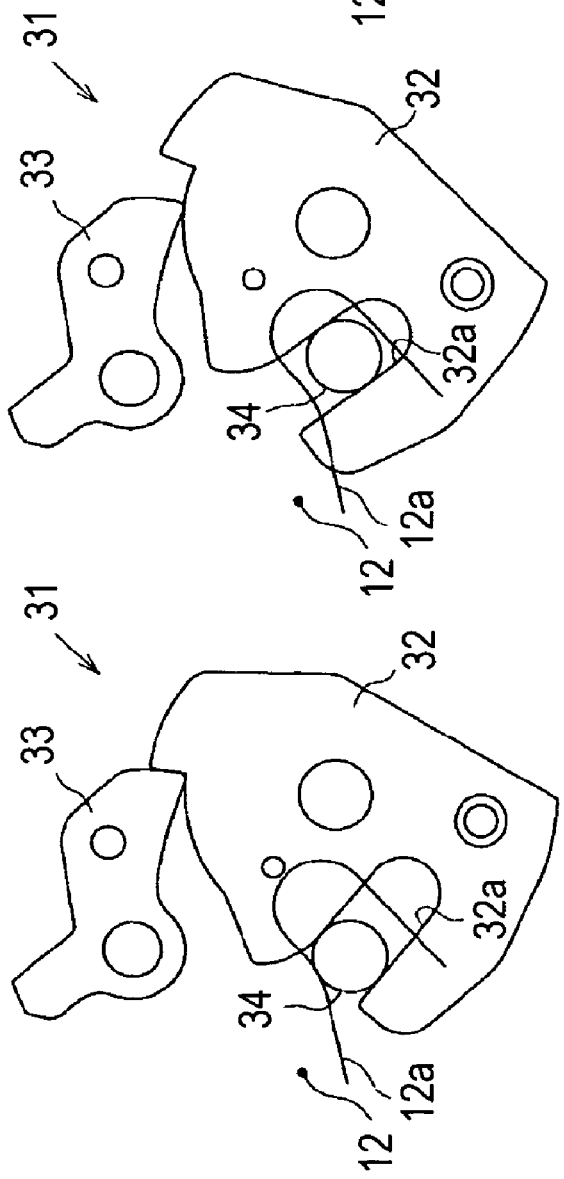

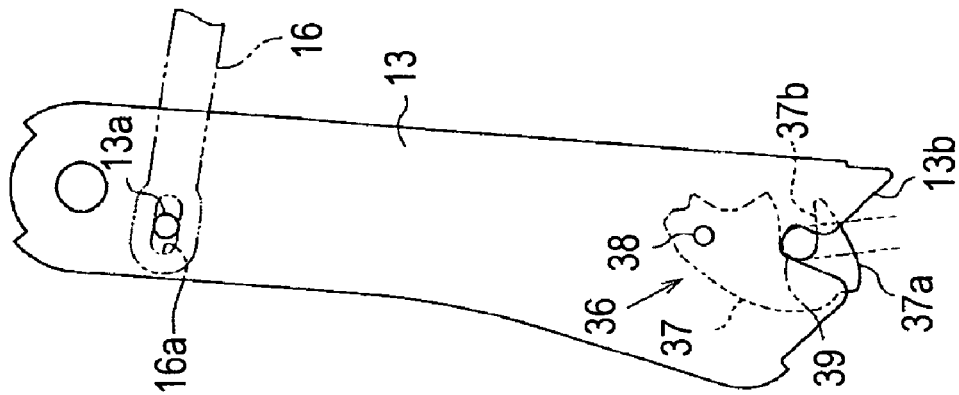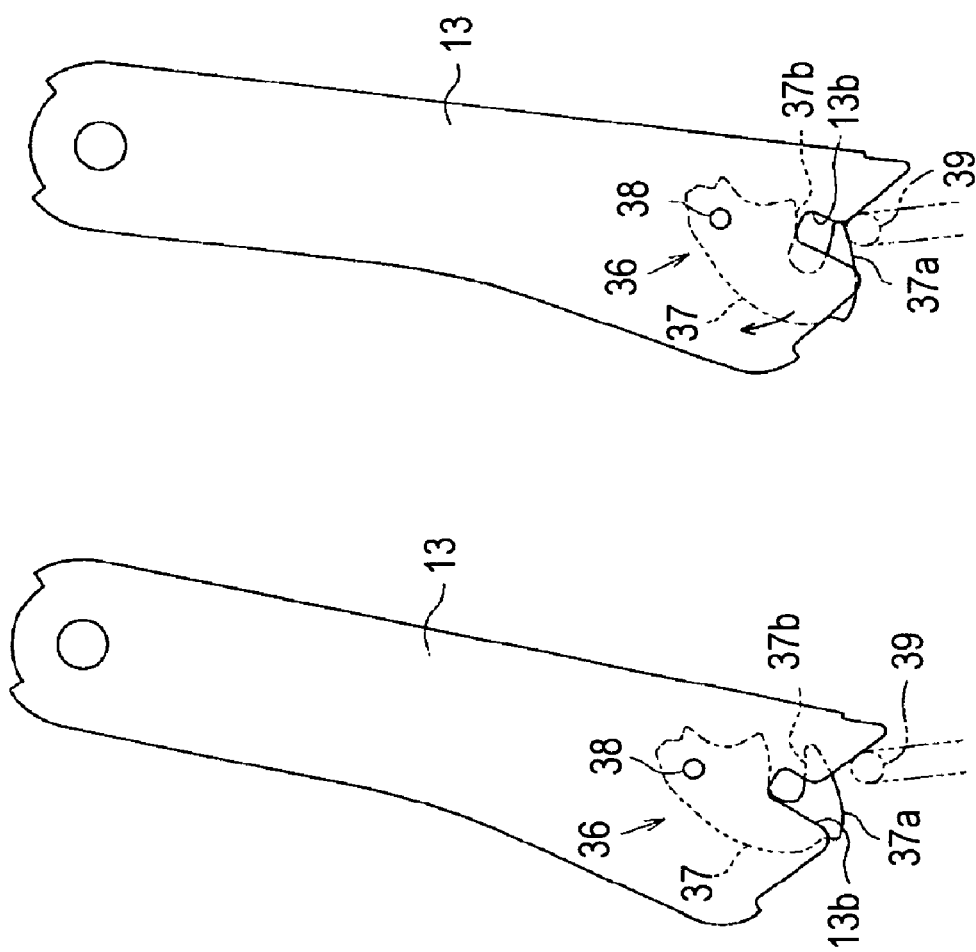

RETRACTABLE SEAT DEVICE

CROSS REFERENCE TO RELATED APPLICATIONS

This application is based on and claims priority under 35 U.S.C. § 119 to Japanese Patent Application 2004-190071, filed on Jun. 28, 2004, the entire content of which is incorporated herein by reference.

BACKGROUND OF THE INVENTION

1. Field of the Invention

The present invention relates to a retractable seat device.

2. Description of the Related Art

A retractable seat device disclosed in, for example, Japanese Unexamined Patent Application Publication No. 2001-347865 is known. This retractable seat device includes a seat body that can be stored in a storage recess provided in a vehicle floor when the seat body is not used. The state of the seat body is switched between the stored state and a usable state by moving the seat body around a rotation center provided on the vehicle floor. More specifically, legs (front and rear legs) for supporting the seat body in the usable state are arranged at the front and rear of the seat body. The rear leg is fixed to a link member that is rotatably connected to the vehicle floor at the rotation center, and the front leg is moved in association with the rear leg by a snap member corresponding to a link. When the link member rotates in a first direction, the front and rear legs are folded in association with the rotation of the link member and the seat body is stored into the storage recess. When the link member rotates in a second direction, the front and rear legs are unfolded in association with the rotation of the link member to support the seat body on the vehicle floor.

The front and rear legs are provided with lock mechanisms that are engageable with strikers arranged on the vehicle floor. The lock mechanisms of the front and rear legs engage with the strikers on the vehicle floor to secure the seat body in the usable state.

The lock mechanisms provided on the front and rear legs typically have an interlock structure shown in FIG. 4 which includes a ratchet (lock disc) 91 and a pawl (lock lever) 92. In this structure, taking the swinging movements of the front and rear legs that are unfolded in association with the rotation of the link member into account, an amount by which a striker 94 can be inserted into a guide groove 93 formed in the front or rear leg is set relatively large (deep) to ensure the reliability of the lock. However, when this interlock structure is used, a large gap C is provided between the striker 94 and an upper wall of the guide groove 93 which faces the striker 94. This gap C generates abnormal noise while the vehicle is in motion, which may annoy the user.

SUMMARY OF THE INVENTION

An object of the present invention is to provide a retractable seat device which suppresses abnormal noise while a vehicle is in motion and thereby relieves annoyance of a user.

According to a first aspect of the present invention, a retractable seat device includes a seat body having a first end rotatably connected to a first leg and a second end rotatably connected to a second leg; a first arm having a first end rotatably connected to a vehicle floor and a second end fixed to the first leg; a second arm having a first end rotatably connected to the vehicle floor and a second end rotatably connected to the seat body; a link having a first end rotatably connected to the first leg and a second end rotatably connected to the second leg. When the first arm is rotated in a first direction, the seat body is stored into a storage section provided at the vehicle floor in such a manner that the first leg and the second leg connected to the first leg with the link are folded. When the first arm is rotated in a second direction, the first leg and the second leg connected to the first leg with the link are unfolded, a first lock mechanism provided on the first leg becomes engaged with a first striker provided on the vehicle floor, and then a second lock mechanism provided on the second leg becomes engaged with a second striker provided on the vehicle floor, so that the seat body is supported on the vehicle floor by the first leg and the second leg. The first lock mechanism has an interlock structure including a ratchet and a pawl, and the second lock mechanism has a hook lock structure including a hook.

In this retractable seat device, the seat body, the first arm fixed to the first leg, and the second arm form a four-link mechanism (four-bar linkage) having fixed ends on the vehicle floor. The orientation of this four-link mechanism is determined in one-to-one correspondence with the rotational position of the first arm.

In addition, the first lock mechanism, which engages with the vehicle floor (first striker) first when the seat body is moved to support the seat body on the vehicle floor by the first leg and the second leg, has an interlock structure including a ratchet and a pawl. Therefore, the first lock mechanism engages with the first striker while absorbing the swinging movement of the first leg, which unfolds in association with the rotation of the first arm in the second direction. In addition, the first end of the seat body is positioned relative to the vehicle floor by the first leg.

The second lock mechanism, which engages with the vehicle floor (second striker) next, engages with the second striker while the first end of the seat body is positioned relative to the vehicle floor by the first leg and the swinging movement of the second leg, which is unfolded by the link, is suppressed to as small an amount as possible. Accordingly, the second end of the seat body is positioned relative to the vehicle floor by the second leg. Since the swinging movement of the second leg is suppressed to as small an amount as possible, even though the second lock mechanism has the hook lock structure including the hook (that is, even though the second lock mechanism does not have an interlock structure), the reliability of the lock can be ensured. More specifically, a gap generated between the striker and the lock mechanism if the lock mechanism has an interlock structure can be eliminated. As a result, abnormal noise generated while the vehicle is in motion is reduced, and the user experiences less annoyance.

In the above-structured retractable seat device, a retaining pin may be provided on one of the second leg and the second end of the link, and a long hole may be formed in the other one of the second leg and the second end of the link. The long hole receives the retaining pin to rotatably connect the second leg and the second end of the link to each other while allowing a swinging movement of the second leg.

Accordingly, in the connection between the second leg and the second end of the link, the swinging movement of the second leg is allowed by the retaining pin and the long hole which receives the retaining pin. Therefore, when, for example, there are individual differences in the dimensions of the seat body and the arrangement of the second striker, the differences can be absorbed within the range of the swinging movement of the second leg. Thus, the second lock mechanism and the second striker can be smoothly engaged with each other.

BRIEF DESCRIPTION OF THE DRAWINGS

FIG. 1 is a side view showing an embodiment of the present invention;

FIG. 2A is a schematic diagram showing a lock state in which an amount of insertion of a rear lock mechanism with respect to a rear striker is small;

FIG. 2B is a schematic diagram showing a lock state in which an amount of insertion of the rear lock mechanism with respect to the rear striker is medium;

FIG. 2C is a schematic diagram showing a lock state in which an amount of insertion of the rear lock mechanism with respect to the rear striker is large;

FIG. 3A is a schematic diagram showing the state in which a front striker starts to enter a guide groove in a front lock mechanism;

FIG. 3B is a schematic diagram showing the state in which the front striker is pushed against a guide surface of a hook in the front lock mechanism;

FIG. 3C is a schematic diagram showing the state in which the front striker is fitted to a retaining grove of the hook in the front lock mechanism.

DESCRIPTION OF THE PREFERRED EMBODIMENT

Figure 4:
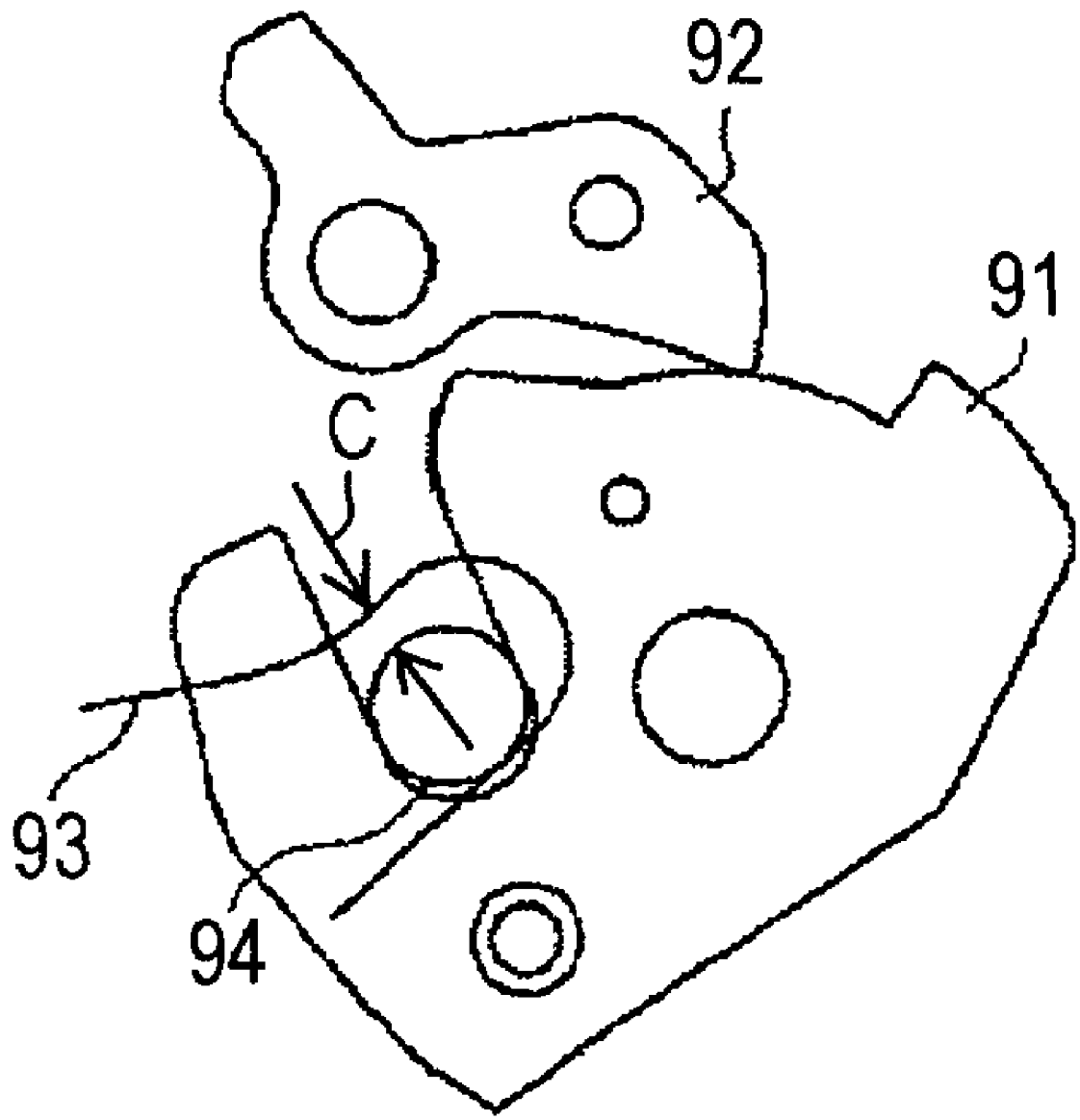
FIG. 4 is a schematic diagram showing a known lock mechanism.

An embodiment of the present invention will be described below with reference to the drawings. FIG. 1 is a side view of a retractable seat device mounted on a vehicle, such as an automobile. The right side of FIG. 1 corresponds to the rear of the vehicle. As shown in FIG. 1, a storage recess 10a, which functions as a storage section, is formed in a rear region of a vehicle floor 10. A seat body 11, which functions as a seat, is either supported on the vehicle floor 10 in front of the storage recess 10a or stored in the storage recess 10a.

In detail, the retractable seat device includes the seat body 11, a rear leg 12 that functions as a first leg, a front leg 13 that functions as a second leg, a first arm 14, a second arm 15, and a link 16.

The seat body 11 includes a seat cushion 11a and a seat back 11b having an adjustable inclination angle with respect to the seat cushion 11a. The seat body 11 is stored in the storage recess 10a in such a manner that the seat back 11b is completely folded onto the seat cushion 11a.

The rear leg 12 is rotatably connected to a first end (the end facing the rear of the vehicle, i.e., the right end in FIG. 1) of the seat body 11 (seat cushion 11a) with a hinge 21. The front leg 13 is rotatably connected to a second end (the end facing the front of the vehicle, i.e., the left end in FIG. 1) of the seat body 11 (seat cushion 11a) with a hinge 22.

A first end of the first arm 14 is rotatably connected to the vehicle floor 10 with a hinge 23 disposed in the storage recess 10a, and a second end of the first arm 14 is fixed to the rear leg 12. A first end of the second arm 15 is rotatably connected to the vehicle floor 10 with a hinge 24 disposed in the storage recess 10a, and a second end of the second arm 15 is rotatably connected to the seat body 11 (seat cushion 11a). Accordingly, the seat body 11, the first arm 14 fixed to the rear leg 12, and the second arm 15 form a four-link mechanism (four-bar linkage) having fixed ends on the vehicle floor 10 (in the storage recess 10a). The orientation of this four-link mechanism is determined in one-to-one correspondence with the rotational position of the first arm 14. When, for example, the first arm 14 rotates clockwise in FIG. 1, the rear leg 12 rotates to fold into the seat body 11. In reverse, when the first arm 14 rotates counterclockwise in FIG. 1, the rear leg 12 rotates to unfold downward from the seat body 11.

The hinge 23 is positioned behind the hinge 24. In addition, the rotation center of the second arm 15 at the second end thereof, which is connected to the seat body 11, is positioned between the hinges 21 and 22. The first arm 14 and the second arm 15 are curved so that they do not interfere with the surrounding structure (inner walls of the storage recess 10a, etc.) when the state of the seat body 11 is switched between a usable state and a stored state.

A first end of the link 16 is rotatably connected to the rear leg 12 at a position above the hinge 21 in FIG. 1 (at a position opposite to a rear lock mechanism 31, which will be described below, with respect to the hinge 21). A second end of the link 16 is rotatably connected to the front leg 13 at a position below the hinge 22 in FIG. 1 (at a position on the same side as a front lock mechanism 36, which will be described below, with respect to the hinge 22). When, for example, the rear leg 12 rotates to fold into the seat body 11 as described above, the front leg 13 is rotated counterclockwise in FIG. 1 by the link 16 so that the front leg 13 also folds into the seat body 11. In reverse, when the rear leg 12 rotates to unfold downward from the seat body 11, the front leg 13 is rotated clockwise in FIG. 1 by the link 16 so that the front leg 13 also unfolds downward from the seat body 11.

The second end of the link 16 is connected to the front leg 13 by inserting a retaining pin 13a that projects from the front leg 13 into a long hole 16a formed at the second end of the link 16 (see FIG. 3C). The longitudinal direction of the long hole 16a is parallel to the circumferential direction of the hinge 22 when the front leg 13 is unfolded downward from the seat body 11. As described below, this long hole 16a allows the swinging movement of the front leg 13 when the front leg 13 is engaged with the vehicle floor 10.

The rear lock mechanism 31, which functions as a first lock mechanism, is provided at an end of the rear leg 12. As shown in FIGS. 2A to 2C, the rear lock mechanism 31 has an interlock structure, and includes a pawl 33 and a ratchet 32 that is rotatably connected to the rear leg 12. The ratchet 32 has a retaining groove 32a which opens at a circumferential side thereof (side facing the front in the clockwise direction in FIGS. 2A to 2C). The vehicle floor 10 has a rear striker 34, which functions as a first striker and faces the rear lock mechanism 31 of the rear leg 12 when the rear leg 12 is unfolded downward.

In the rear lock mechanism 31, when the rear leg 12 unfolds downward, the rear striker 34 enters a guide groove 12a formed in the rear leg 12 and pushes the inner wall of the retaining groove 32a, so that the ratchet 32 rotates clockwise in FIGS. 2A to 2C. The rear lock mechanism 31 clamps the rear striker 34 with the retaining groove 32a as the ratchet 32 rotates, and then the rotation of the ratchet 32 is locked by the pawl 33 so that the rear leg 12 is fixed to the vehicle floor 10. Accordingly, the rear leg 12 is supported on the vehicle floor 10 by the contact portion between the retaining groove 32a of the ratchet 32 and the rear striker 34. The engagement between the rear lock mechanism 31 and the rear striker 34 is retained by an urging force exerted by an urging member (not shown).

In the rear lock mechanism 31, an amount by which the rear striker 34 can be inserted is set to be large (deep) to ensure the reliability of the lock for each of the states shown in FIGS. 2A, 2B, and 2C in which the amount of insertion of the rear striker 34 is small, medium, and large, respectively. Accordingly, the swinging movement of the rear leg 12, which unfolds downward in association with the rotation of the first arm 14, is absorbed, and the reliability of the lock is increased.

The front lock mechanism 36, which functions as a second lock mechanism, is provided at an end of the front leg 13. As shown in FIGS. 3A to 3C, the front lock mechanism 36 has a hook lock structure and includes a hook 37 that is rotatably connected to the front leg 13 with a pin 38. The hook 37 extends downward from the rotation center (pin 38) thereof and has a guide surface 37a that inclines towards the upper right with respect to the circumferential direction at an end of the hook 37. The guide surface 37a is disposed in a guide groove 13b formed in the front leg 13 at the end thereof. The hook 37 has a retaining groove 37b which continues from the guide surface 37a and opens at a circumferential side (right side in FIGS. 3A to 3C). The orientation of the hook 37 in this state is retained by an urging force exerted by an urging member (not shown). The vehicle floor 10 has a front striker 39, which functions as a second striker and faces the front lock mechanism 36 of the front leg 13 when the front leg 13 is unfolded.

In the front lock mechanism 36, when the front leg 13 is unfolded downward, the front striker 39 enters the guide groove 13b (FIG. 3A) and pushes the guide surface 37a, so that the hook 37 rotates clockwise in FIGS. 3A to 3B against the urging force applied by the urging member (FIG. 3B). Then, when the front striker 39 reaches the end of the guide surface 37a, the urging member returns to the original position by the resilient force, and accordingly the front lock mechanism 36 clamps the front striker 39 in the retaining groove 37b (FIG. 3C). Thus, the front leg 13 is fixed on the vehicle floor 10. Accordingly, the front leg 13 is supported on the vehicle floor 10 by the upper and lower contact portions between the retaining groove 37b in the hook 37 and the front striker 39. The engagement between the front lock mechanism 36 and the front striker 39 is, of course, retained by the urging force exerted by the above-mentioned urging member. In the front lock mechanism 36 having the hook lock structure, the urging force applied to the hook 37 by the urging member and the pressing angle at which the front striker 39 presses the pressing surface of the retaining groove 37b are set such that gaps between the inner walls of the retaining groove 37b and the front striker 39 are minimized.

The overall operation according to the present embodiment will be described below. First, the case in which the state of the seat body 11 is switched from the usable state to the stored state (unused state) will be described. In the following description, it is assumed that the engagements between the rear lock mechanism 31 and the rear striker 34 and between the front lock mechanism 36 and the front striker 39 are canceled before switching the states. The engagement can be canceled by, for example, transmitting an operating force applied by an operation lever (not shown) or a drive force applied from an actuator to the rear lock mechanism 31 and the front lock mechanism 36. When the first arm 14 is rotated in a first direction (clockwise in FIG. 1), the rear leg 12 and the front leg 13, which is connected to the rear leg 12 with the link 16, are folded and the seat body 11 moves into the storage recess 10a.

Next, the case in which the state of the seat body 11 is switched from the stored state to the usable state will be described below. When the first arm 14 is rotated in a second direction (counterclockwise in FIG. 1), the rear leg 12 and the front leg 13, which is connected to the rear leg 12 with the link 16, are unfolded and the rear lock mechanism 31 and the rear striker 34 become engaged with each other in the above-described manner. Next, the front lock mechanism 36 and the front striker 39 become engaged with each other. Accordingly, the seat body 11 is supported on the vehicle floor 10 by the rear leg 12 and the front leg 13.

As described in detail above, the present embodiment provides the following advantages:

(1) According to the present embodiment, the rear lock mechanism 31, which engages with the vehicle floor 10 (rear striker 34) first when the seat body 11 is moved to support the seat body 11 on the vehicle floor 10 by the rear leg 12 and the front leg 13, has an interlock structure including a ratchet 32 and a pawl 33. Therefore, the rear lock mechanism 31 engages with the rear striker 34 while absorbing the swinging movement of the rear leg 12, which unfolds in association with the rotation of the first arm 14 in the second direction (counterclockwise in FIG. 1). In addition, the rear of the seat body 11 is positioned relative to the vehicle floor 10 by the rear leg 12.

The front lock mechanism 36, which engages with the vehicle floor 10 (front striker 39) next, engages with the front striker 39 while the rear of the seat body 11 is positioned relative to the vehicle floor 10 by the rear leg 12 and the swinging movement of the front leg 13, which is unfolded by the link 16, is suppressed to as small an amount as possible. Accordingly, the front of the seat body 11 is positioned relative to the vehicle floor 10 by the front leg 13.

Since the swinging movement of the front leg 13 is suppressed to as small an amount as possible, even though the front lock mechanism 36 has a hook lock structure including the hook 37 (that is, even though the front lock mechanism 36 does not have an interlock structure), the reliability of the lock can be ensured. More specifically, the gap C (see FIG. 2C), which is generated between the striker and the lock mechanism if the lock mechanism has an interlock structure, can be eliminated. As a result, abnormal noise generated while the vehicle is in motion is reduced, and the user experiences less annoyance.

(2) According to the present embodiment, in the connection between the front leg 13 and the second end of the link 16, the swinging movement of the front leg 13 around the hinge 22 is allowed by the retaining pin 13a and the long hole 16a. Therefore, when, for example, there are individual differences in the dimensions of the seat body 11 (frame) and the arrangement of the front striker 39, the differences can be absorbed within the range of the swinging movement of the front leg 13. Thus, the front lock mechanism 36 and the front striker 39 can be smoothly engaged with each other. The swinging movement allowed for the front leg 13 is different from the vertical movement, which greatly contributes to the generation of abnormal noise when the vehicle is in motion, and therefore this swinging movement does not serve to increase the abnormal noise.

(3) According to the present embodiment, the seat body 11 can be supported on the vehicle floor 10 while absorbing the differences in the dimensions of the seat body 11 (frame) and the arrangement of the front striker 39 with a simple structure without increasing the number of components.

The above-described embodiment may be modified as follows:

In the embodiment, the rear leg 12 and the first arm 14 may be formed integrally.

In the embodiment, the long hole may be formed in the front leg 13 and the retaining pin may be provided at the second end of the link 16.

In the embodiment, the seat body 11 may be stored in a storage box placed on the vehicle floor 10. In this case, the rotation centers (hinges 23 and 24) of the first and second arms 14 and 15 may be arranged on the vehicle floor 10.

The seat body 11 may be stored at a position in front of or at a side of the seat body 11 in the usable state.

Other modifications to the embodiment are also possible within the scope of the present invention.

What is claimed is:

1. A retractable seat device comprising:
    a seat body having a first end rotatably connected to a first leg and a second end rotatably connected to a second leg;
    a first arm having a first end rotatably connected to a vehicle floor and a second end fixed to the first leg;
    a second arm having a first end rotatably connected to the vehicle floor and a second end rotatably connected to the seat body;
    a link having a first end rotatably connected to the first leg and a second end rotatably connected to the second leg;
    wherein, when the first arm is rotated in a first direction, the seat body is stored into a storage section provided at the vehicle floor in such a manner that the first leg and the second leg connected to the first leg with the link are folded,
    wherein, when the first arm is rotated in a second direction, the first leg and the second leg connected to the first leg with the link are unfolded, a first lock mechanism provided on the first leg becomes engaged with a first striker provided on the vehicle floor, and then a second lock mechanism provided on the second leg becomes engaged with a second striker provided on the vehicle floor, so that the seat body is supported on the vehicle floor by the first leg and the second leg, and
    wherein the first lock mechanism has an interlock structure including a ratchet and a pawl, and the second lock mechanism has a hook lock structure including a hook.

2. The retractable seat device according to claim 1, wherein a retaining pin is provided on one of the second leg and the second end of the link, and a long hole is formed in the other one of the second leg and the second end of the link, the long hole receiving the retaining pin to rotatably connect the second leg and the second end of the link to each other while allowing a swinging movement of the second leg.

3. The retractable seat device according to claim 1, wherein the first end of the link is connected to the first leg at a position opposite to the first lock mechanism with respect to a connecting portion between the first leg and the seat body, and the second end of the link is connected to the second leg at a position on the same side as the second lock mechanism with respect to a connecting portion between the second leg and the seat body.

4. The retractable seat device according to claim 1, wherein the storage section is a storage recess formed in the vehicle floor.

5. The retractable seat device according to claim 1, wherein the storage section is a storage box placed on the vehicle floor.

6. The retractable seat device according to claim 1, wherein the first leg and the first arm are integrated with each other.

7. The retractable seat device according to claim 1, wherein a connecting portion between the second arm and the vehicle floor is nearer to the second striker than a connecting portion between the first arm and the vehicle floor, and a connecting portion between the second arm and the seat body is nearer to the second striker than a connecting portion between the first leg and the seat body.

8. The retractable seat device according to claim 2, wherein the long hole extends in a circumferential direction around a connecting portion between the second leg and the seat body when the second leg is unfolded downward.

* * * * *